(12) United States Patent
Ishikawa et al.

(10) Patent No.: US 11,440,110 B2
(45) Date of Patent: Sep. 13, 2022

(54) MACHINING APPARATUS AND MACHINING METHOD

(71) Applicants: Subaru Corporation, Tokyo (JP); FUYO JITSUGYO CO. LTD., Yamanashi (JP)

(72) Inventors: Yuichi Ishikawa, Tokyo (JP); Atsushi Rihei, Tokyo (JP); Shinya Matsuo, Tokyo (JP); Tatsuo Nakahata, Tokyo (JP); Yasuto Nishiwaki, Tokyo (JP); Masao Watanabe, Tokyo (JP); Saichiro Yamashita, Yamanashi (JP); Yasushi Miyashita, Yamanashi (JP)

(73) Assignees: SUBARU CORPORATION, Tokyo (JP); FUYO JITSUGYO CO. LTD., Yamanashi (JP)

( * ) Notice: Subject to any disclaimer, the term of this patent is extended or adjusted under 35 U.S.C. 154(b) by 0 days.

(21) Appl. No.: 16/690,245

(22) Filed: Nov. 21, 2019

(65) Prior Publication Data

US 2020/0086406 A1 Mar. 19, 2020

Related U.S. Application Data

(62) Division of application No. 15/200,087, filed on Jul. 1, 2016, now abandoned.

(30) Foreign Application Priority Data

Jul. 9, 2015 (JP) .................................. 2015-138137

(51) Int. Cl.
*B23D 55/06* (2006.01)
*B23D 53/00* (2006.01)
(Continued)

(52) U.S. Cl.
CPC .............. *B23D 55/06* (2013.01); *B23D 53/00* (2013.01); *B23D 57/0053* (2013.01);
(Continued)

(58) Field of Classification Search
CPC ........ B23D 55/06; B23D 53/00; B23D 53/02; B64F 5/10; B25J 9/1694; B25J 11/0055;
(Continued)

(56) References Cited

U.S. PATENT DOCUMENTS 3,739,679 A 6/1973 Schwend
4,909,108 A 3/1990 Nakada et al.
(Continued)

FOREIGN PATENT DOCUMENTS

CA 3066343 11/2019
CN 2404648 Y 11/2000
(Continued)

OTHER PUBLICATIONS

First Japanese Office Action dated Feb. 20, 2020 in JP Patent Application No. 2018-558856 (8 pages inclusive of its English machine translation).

(Continued)

*Primary Examiner* — Evan H MacFarlane
*Assistant Examiner* — Liang Dong
(74) *Attorney, Agent, or Firm* — Smith, Gambrell & Russell, LLP

(57) ABSTRACT

According to one implementation, a machining apparatus includes an electromotive saw and an attaching structure. The electromotive saw cuts off a workpiece to be machined. The attaching structure attaches the saw to an arm of a robot. Further, according to one implementation, a machining method is provided. In the machining method, a machined product is manufactured by processing a composite material or a honeycomb structure with a cutting tool attached to an (Continued)

arm of a robot. Further, according to one implementation, a machining method is provided. In the machining method, a machined product is manufactured by processing a workpiece to be machined with a cutting tool attached to an arm of a robot. The workpiece is processed along a shape of a jig for setting the workpiece. The workpiece is processed with contacting a guide with the jig. The guide is attached to the arm.

21 Claims, 5 Drawing Sheets

(51) Int. Cl.
| | |
|---|---|
| B23D 57/00 | (2006.01) |
| B23D 57/02 | (2006.01) |
| B25J 11/00 | (2006.01) |
| B25J 13/08 | (2006.01) |
| B25J 9/16 | (2006.01) |
| B64F 5/10 | (2017.01) |

(52) U.S. Cl.
CPC ............ *B23D 57/02* (2013.01); *B25J 9/1694* (2013.01); *B25J 11/0055* (2013.01); *B25J 13/085* (2013.01); *B64F 5/10* (2017.01); *G05B 2219/45044* (2013.01); *G05B 2219/49195* (2013.01); *G05B 2219/50125* (2013.01); *G05B 2219/50167* (2013.01); *Y10S 901/09* (2013.01)

(58) Field of Classification Search
CPC ......... B25J 13/085; G05B 2219/45044; G05B 2219/49195; G05B 2219/50125; G05B 2219/50167
See application file for complete search history.

(56) References Cited

U.S. PATENT DOCUMENTS

| | | | |
|---|---|---|---|
| 5,165,829 A | 11/1992 | Ross et al. | |
| 5,333,974 A | 8/1994 | Matsuura | |
| 5,394,513 A | 2/1995 | Sgarbi et al. | |
| 8,806,999 B2 | 8/2014 | Tanaka | |
| 9,339,906 B2 | 5/2016 | Kobayashi | |
| 9,539,686 B2 | 1/2017 | Tanaka | |
| 9,724,801 B2 | 8/2017 | Gu | |
| 2004/0058636 A1* | 3/2004 | Hinsch | A22B 5/206 452/156 |
| 2010/0106285 A1* | 4/2010 | Massey | B23K 9/16 700/212 |
| 2010/0185315 A1 | 7/2010 | Schmidt et al. | |
| 2011/0170973 A1 | 7/2011 | Von Puttkamer et al. | |
| 2012/0220194 A1 | 8/2012 | Maloney et al. | |
| 2013/0312991 A1 | 11/2013 | Hideta et al. | |
| 2016/0303697 A1 | 10/2016 | Isobe | |
| 2016/0318151 A1 | 11/2016 | Kitahata et al. | |
| 2016/0332273 A1 | 11/2016 | Furuya | |
| 2017/0008102 A1 | 1/2017 | Ishikawa et al. | |
| 2018/0104850 A1* | 4/2018 | Guazzoni | B28D 1/003 |
| 2018/0126507 A1 | 5/2018 | Rivers et al. | |
| 2020/0108481 A1 | 4/2020 | Matsuo et al. | |
| 2020/0122336 A1 | 4/2020 | Matsuo et al. | |
| 2021/0291369 A1 | 9/2021 | Hashimoto et al. | |
| 2021/0299867 A1 | 9/2021 | Kenneally et al. | |

FOREIGN PATENT DOCUMENTS

| | | | |
|---|---|---|---|
| CN | 1415458 A | 5/2003 | |
| CN | 101801617 A | 8/2010 | |
| CN | 104249195 A | 12/2014 | |
| CN | 1043 64049 A | 2/2015 | |
| CN | 105269690 A | 1/2016 | |
| EP | 0292971 A2 | 11/1988 | |
| EP | 2946864 A1 * | 11/2015 | B25J 15/0019 |
| EP | 2946864 A1 | 11/2015 | |
| EP | 3563988 | 11/2019 | |
| FR | 2682905 B1 | 4/1993 | |
| GB | 1 231 289 | 5/1971 | |
| JP | S49-013677 | 4/1974 | |
| JP | S54-160707 A | 12/1979 | |
| JP | S59-140121 U | 9/1984 | |
| JP | S60-025673 A | 2/1985 | |
| JP | H03-047719 | 5/1991 | |
| JP | 1993-012058 U | 2/1993 | |
| JP | H05-020816 U | 3/1993 | |
| JP | H05-134737 A | 6/1993 | |
| JP | H07-132471 | 5/1995 | |
| JP | H09-155738 | 6/1997 | |
| JP | H10-011125 | 1/1998 | |
| JP | 2000-343401 A | 12/2000 | |
| JP | 2002-018629 A | 1/2002 | |
| JP | 2002-239824 A | 8/2002 | |
| JP | 2002-370116 | 12/2002 | |
| JP | 2006-142434 A | 6/2006 | |
| JP | 2006-320991 A | 11/2006 | |
| JP | 2010-253613 A | 11/2010 | |
| JP | 2010253613 A * | 11/2010 | |
| JP | 2011-216050 A | 10/2011 | |
| JP | 2012-139789 A | 7/2012 | |
| JP | 2013-043232 | 3/2013 | |
| JP | 2013-244556 A | 12/2013 | |
| JP | 2013-244564 | 12/2013 | |
| JP | 2014-040001 A | 3/2014 | |
| JP | 2017-019042 A | 1/2017 | |
| WO | 2016/183390 A1 | 11/2016 | |
| WO | 2018/123251 | 7/2018 | |
| WO | 2018/235429 | 12/2018 | |

OTHER PUBLICATIONS

Office Action received in Chinese Patent Application No. 201610524801.7 dated Dec. 4, 2018 (9 pages in Chinese).

Office Action received In Japanese Patent Application No. 2015-138137 dated Jun. 4, 2019 (4 pages in Japanese with English translation).

Second Office Action received in Chinese Patent Application No. 201610524801.7 dated Aug. 5, 2019 (5 pages in Chinese with English translation).

First Japanese office action dated Dec. 22, 2020 in Patent Application No. 2019-525184 (7 pages in Japanese with machine translation).

Supplemental Partial European Search Report Received in EP Application No. 17887317 dated Dec. 4, 2020 (29 Pages).

Pan, Z., et al. Robotic machining from programming to process control: a complete solution by force control. Industrial Robot. 2008. vol. 35, No. 5, pp. 400-409.

Song, H-C., et al. Precision robotic deburring based on force control for arbitrarily shaped workpiece using CAD model matching. International Journal of Precision Engineering and Manufacturing. 2012. vol. 14, No. 1, pp. 85-91.

Alici, G., et al. Robotic drilling under force control: Execution of a task. Proceedings of the IEEE/RSJ/GI International Conference on Intelligent Robots and Systems: Advanced Robotics and the Real World. 1994. Vol. 3, pp. 1618-1625.

Slamani, M., et al. Comparison of surface roughness quality obtained by high speed CNC trimming and high speed robotic trimming for CFRP laminate. Robotics and Computer-Integrated Manufacturing, Elsevier Science Publishers BV. 2016. vol. 42, pp. 63-72.

Extended European search report dated Feb. 12, 2021 in EP Patent Application No. 18 820 149.5 (6 pages).

Non Final Office Action dated May 10, 2021 for U.S. Appl. No. 16/471,633 (53 Pages).

Japanese Office Action dated Aug. 24, 2021 for Japanese Patent Application No. 2019-525184 (6 pages in Japanese with English Translation).

Notice of Allowance and Fees Due Received in U.S. Appl. No. 16/471,633 dated Jan. 26, 2022 (6 pages).

(56) References Cited

OTHER PUBLICATIONS

Final Office Action Received in U.S. Appl. No. 16/471,633 dated Oct. 25, 2021 (23 pages).

* cited by examiner

MACHINING APPARATUS AND MACHINING METHOD

CROSS REFERENCES TO RELATED APPLICATIONS

This application is based upon and claims the benefit of priority from Japanese Patent Application No. 2015-138137, filed on Jul. 9, 2015; the entire contents of which are incorporated herein by reference.

FIELD

Implementations described herein relate generally to a machining apparatus and a machining method.

BACKGROUND

As a material for a part, such as an aircraft part, which requires high strength and weight saving, a composite material or a honeycomb structural body is conventionally used. As a method for manufacturing a part, having a predetermined shape, from a material consisting of a composite material or a honeycomb structural body, a machining process using a cutting tool, such as an end mill, is mentioned.

For example, when an aircraft part, such as a panel, made by a composite material, is manufactured, an end mill is attached to a column type machine tool, such as a milling machine or a machining center, and machining process, such as outline machining, is performed (for example, refer to Japanese Patent Application Publication JP2013-244556A). On the other hand, when an aircraft part made by a honeycomb structural object is manufactured, a honeycomb core material having a predetermined size is cut out by a saw, such as a commercially available bandsaw or metal slitting saw beforehand, and finishing processing of an outline, a surface and the like is performed by manual work using hand tools or by machining process using a column type machine tool (for example, refer to Japanese Patent Application Publication JP2002-18629A).

An object of the present invention is to enable it to machine a part, such as composite material or a honeycomb structure, at lower cost.

SUMMARY OF THE INVENTION

In general, according to one implementation, a machining apparatus includes an electromotive saw and an attaching structure. The electromotive saw cuts off a workpiece to be machined. The attaching structure attaches the saw to an arm of a robot.

Further, according to one implementation, a machining method is provided. In the machining method, a machined product is manufactured by processing a composite material or a honeycomb structure with a cutting tool attached to an arm of a robot.

Further, according to one implementation, a machining method is provided. In the machining method, a machined product is manufactured by processing a workpiece to be machined with a cutting tool attached to an arm of a robot. The workpiece is processed along a shape of a jig for setting the workpiece. The workpiece is processed with contacting a guide with the jig. The guide is attached to the arm.

BRIEF DESCRIPTION OF THE DRAWINGS

In the accompanying drawings.

DETAILED DESCRIPTION

A machining apparatus and a machining method according to implementations of the present invention will be described with reference to the accompanying drawings.

(Structure and Function)

Figure 1:
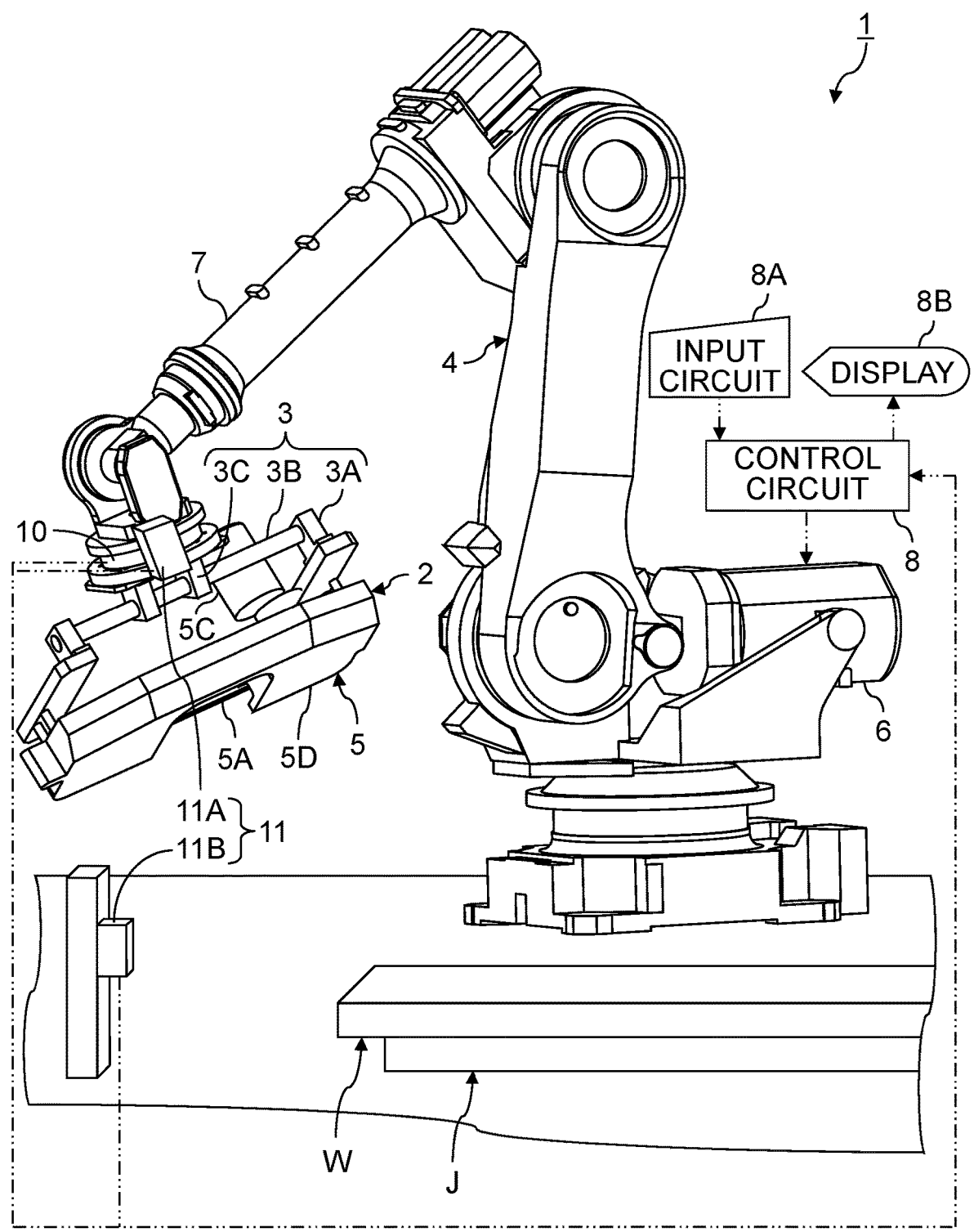
FIG. 1 is a perspective view showing a structure of a machining apparatus according to an implementation of the present invention.
Figure 2:
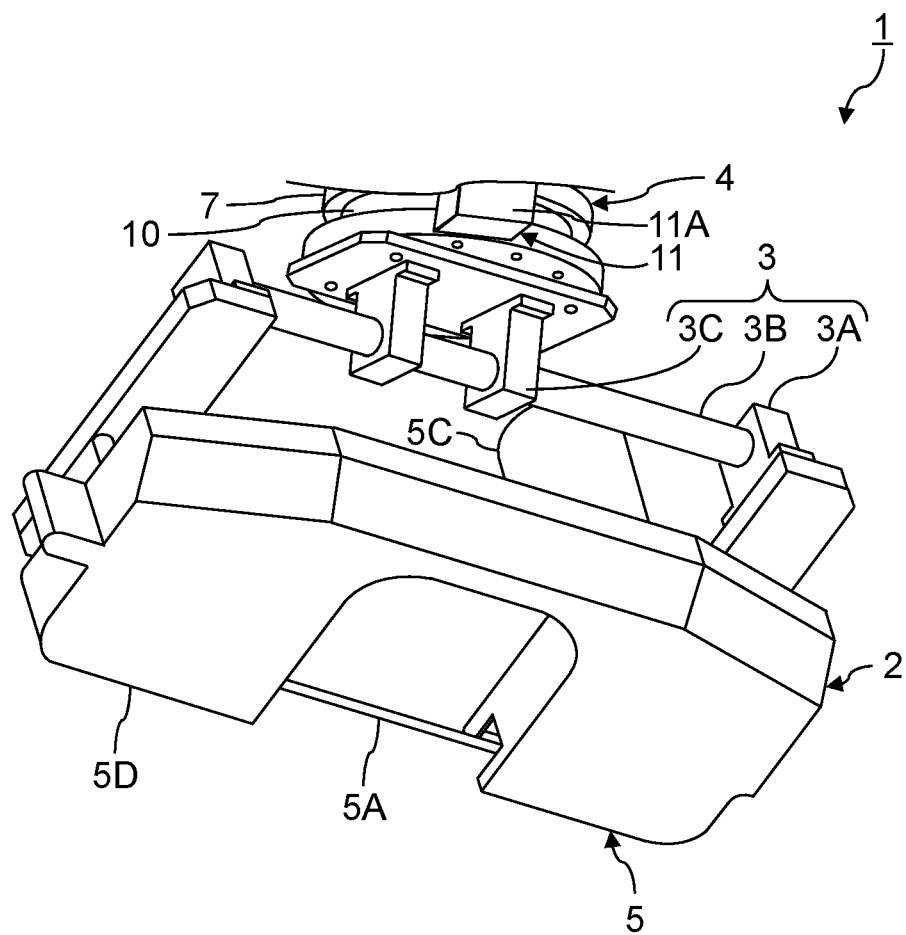
FIG. 2 is a perspective view of an end part of a robot arm, an attaching mechanism and an electromotive saw, shown in FIG. 1, as viewed from another direction.
Figure 3:
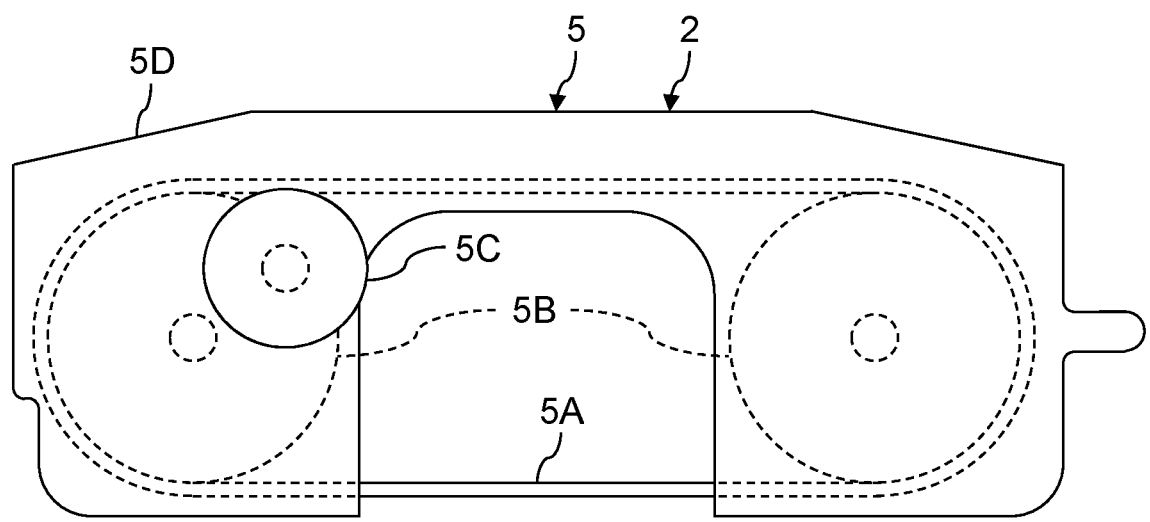
FIG. 3 is a front view of a band saw shown in FIG. 1.

FIG. 1 is a perspective view showing a structure of a machining apparatus according to an implementation of the present invention. FIG. 2 is a perspective view of an end part of a robot arm, an attaching mechanism and an electromotive saw, shown in FIG. 1, as viewed from another direction. FIG. 3 is a front view of a band saw shown in FIG. 1.

A machining apparatus 1 includes an electromotive saw 2, for cutting a workpiece W to be machined, which is attached to a robot 4 by an attaching mechanism 3. In the illustrated example, a band saw 5 is used as the electromotive saw 2. As a matter of course, another electromotive saw 2, such as a wire saw, a jigsaw, or a chain saw may be used.

The electromotive band saw 5 is a power tool which is driven by rotating a belt-shaped and ringed blade 5A, having an edge, with pulling the ringed blade 5A from an inner side with not less than two pulleys 5B. Accordingly, a motor 5C is prepared in the band saw 5 as a power source for rotating the pulleys 5B. In the illustrated example, the two pulleys 5B have been placed in a casing 5D of the band saw 5, and the band saw 5 has been configured so that a part of the blade 5A may pass through the outside of the casing 5D while the blade 5A rotates. Therefore, a workpiece W to be machined is to be cut by a linear part of the blade 5A passing through the outside of the casing 5D.

An electromotive wire saw is a power tool which is driven by rotating a ringed cutting wire, to which diamond particles or the like have adhered, with pulling the ringed cutting wire from an inner side with not less than two pulleys. A wire saw has an advantage that the cutting direction can be changed easily because of freeness from the cutting direction. A jigsaw is a power tool which cuts a workpiece W to be machined by reciprocating a blade having an edge. A chain saw is a power tool which cuts a workpiece W to be machined by rotating a chain, having many blades, along the outer periphery of a plate with power.

The robot 4 is a driving mechanism, such as a jointed-arm robot, which has an arm 7 which drives by a power source 6, such as a motor. In the illustrated example, a jointed-arm robot in which many joints can be rotated with a link mechanism has been used. As a matter of course, a simple robot which has a single drive axis may be used, and alternatively a robot which has plural drive axes may be used.

For example, a commercially available jointed-arm robot disclosed on Japanese Patent Application Publication JP2011-41992 or the like may be used as the robot 4 of the machining apparatus 1. Note that, a general-purpose machining apparatus 1 may be composed of the electromotive saw 2 and the attaching mechanism 3 so that the electromotive saw 2 can be attached to various robots to be used, instead of installing the robot 4 itself as a component. In that case, the machining apparatus 1 is a power tool which can be attached with a desired robot by the attaching mechanism 3.

The robot 4 is controlled by a control circuit 8. The control circuit 8 can be configured by processing circuitry, such as a processor, which executes control program of the robot 4. Moreover, an input circuit 8A and a display 8B are connected to the control circuit 8, as needed.

The attaching mechanism 3 is an attachment for attaching the saw 2 with the arm 7 of the robot 4. Thereby, it becomes possible to cut a workpiece W to be machined with attaching the saw 2 with a multijoint robot or the like. In the example shown in the figures, the attaching mechanism 3 having structure in which attaching implements 3C to be attached to the arm 7 are disposed on a rod 3B and attaching implements 3A for attaching the saw 2 are disposed at the both ends of the rod 3B has been used as an attachment.

Note that, machining of a workpiece W to be machined may include cutting other than scission. For that reason, the attaching mechanism 3 can have structure which can be attached to and detached from the arm 7 of the robot 4. Thereby, it becomes possible to perform a variety of machining process by attaching different kinds of electric power tools to the arm 7 of the robot 4.

As a practical example, when an attaching mechanism for attaching a tool, such as an end mill or a drill, which performs cutting processing with rotating the tool around a tool axis, to the arm 7 of the robot 4 is prepared, it becomes possible to perform outline finish processing and/or surface finish processing with end mills after cutting a workpiece W to be machined off with the saw 2, or conversely, cut a workpiece W to be machined off with the saw 2 after performing milling with end mills. That is, a removable jig for attaching the saw 2 to the arm 7 of the robot 4 and a removable jig for attaching another tool, such as an end mill, to the arm 7 of the robot 4 can be prepared so that they can be exchanged.

When at least the saw 2 is attached to the arm 7 of the robot 4, not only machining of a metal plate material and a metal block material, but also machining of a composite material, such as GFRP (glass fiber reinforced plastics) or CFRP (carbon fiber reinforced plastics), and machining of a honeycomb structure made of a composite material or a metal can be performed at low cost by the machining apparatus 1.

For example, when machining process is performed using a column type machine tool having a large scale, extensive work for installation of the machine tool and construction of a building which has a width for placing the machine tool are necessary. By contrast, when the machining apparatus 1 to which an electric power tool, such as the saw 2, has been attached to the arm 7 of the robot 4 is used, it is possible to considerably reduce the scale, cost, and occupied area of the machining apparatus 1, compared to the case where a machine tool is installed.

In addition, when a cut margin removed by machining process is large and a surface after the machining is a flat or a two dimensional curved surface, a processing time can be shortened by cutoff processing using the saw 2 instead of milling using end mills. As a specific example, in the case of chamfer processing for forming a C chamfer or outline processing, a surface after the processing becomes a flat or a two dimensional curved surface. Therefore, when a cut margin is large, severing processing by the saw 2 can increase efficiency of machining process.

Figure 4:
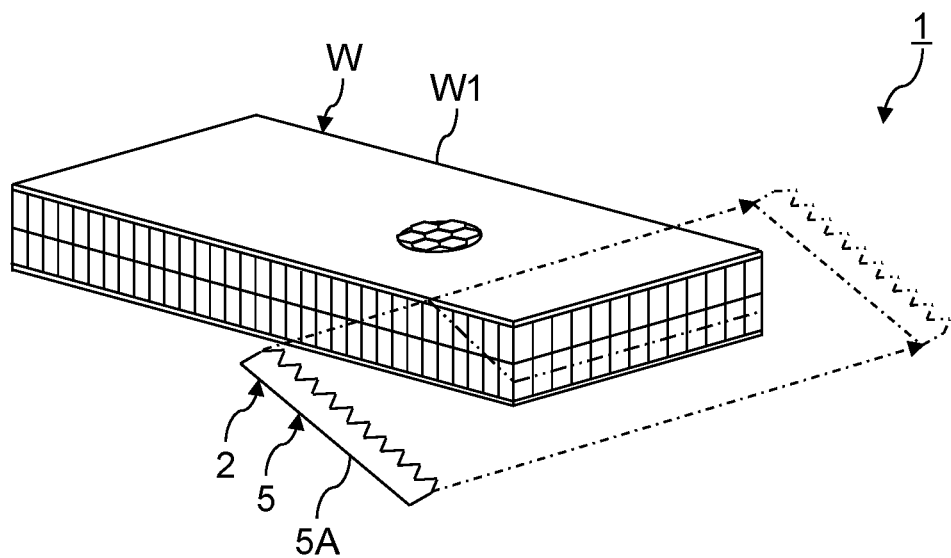
FIG. 4 is a view for explaining an example case of chamfering a honeycomb core by cutting processing with the saw 2.

FIG. 4 is a view for explaining an example case of chamfering a honeycomb core by cutting processing with the saw 2.

As shown in FIG. 4, in the case of forming a chamfer on a honeycomb core W1, moving the blade 5A of the band saw 5 in parallel according to an angle of the chamfer requires the least amount of processing for forming the chamfer on the honeycomb core W1. Specifically, it becomes possible to dramatically reduce the amount of cutting, compared to the case of cutting the honeycomb core W1 using an end mill. As a result, a processing time required for chamfer processing can be shortened. As a matter of course, not only limited to chamfer processing of the honeycomb core W1 but the similar applies to the case of chamfer processing of a block material or a plate material consisting of a composite material or a metal.

When the arm 7 of the robot 4 has necessary drive axes, an angle of the blade 5A can also be changed during cutting. Furthermore, when a wire saw is used as the saw 2, a cutting direction can be changed during cutting. Thus, when the machining apparatus 1 is used, not only flat surface processing but also curved surface processing can be performed. As a practical example, outline processing of a panel made of a metal, a composite material, or a honeycomb core can be performed.

Note that, positioning accuracy of an arm of a multijoint robot is extremely low compared to positioning accuracy of the main spindle of a machine tool since the arm of the multijoint robot has a cantilever structure. For example, in the case of a machine tool, a tool can be positioned with a pitch from 0.01 mm to 0.001 mm. By contrast, positioning accuracy similar to that of a machine tool cannot be easily obtained for a multijoint robot because of dispersion in the positioning accuracy of the multijoint robot.

In general, a tolerance corresponding to an accuracy required for an aircraft part, such as a spar, a rib, a panel, and a stringer, is from ±0.1 mm to ±1.0 mm. Therefore, when machining process is performed by automatic control of a multijoint robot, a required tolerance may not be satisfied due to dispersion in processing accuracy. That is, when machining process is performed merely by automatic control of a multijoint robot, it is difficult to satisfy design requirements of an aircraft part stably. This is the reason a machine tool has been conventionally used for machining process of a part, such as an aircraft part, which requires the accuracy.

Actually, in the case of performing outline processing of a composite material, outline processing of a honeycomb structure, chamfer processing of a composite material, chamfer processing of a honeycomb structure or the like in the condition that a machine tool could not be used, a worker conventionally performed crude processing with a hand tool, such as a band saw or a metal saw, and subsequently, it was necessary to manually perform finish processing.

For that reason, the machining apparatus 1 can have a guide for securing processing accuracy.

Figure 5:
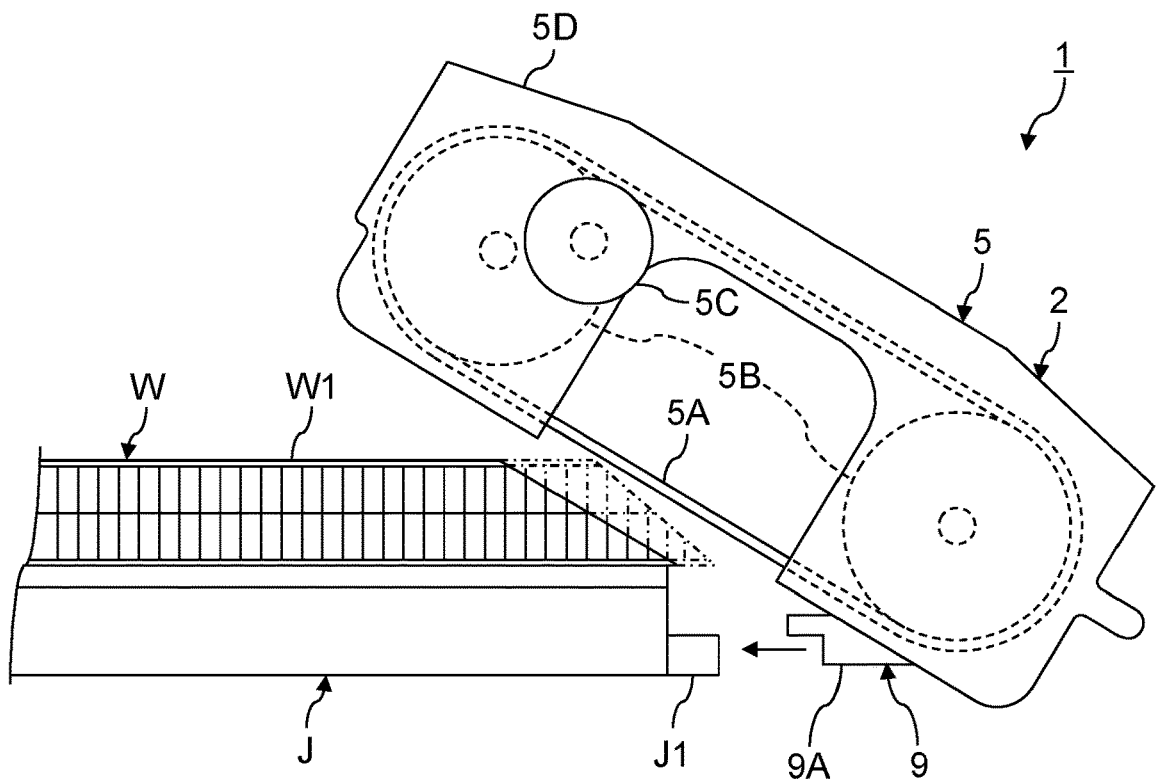
FIG. 5 is a view showing an example of guide for securing processing accuracy of the machining apparatus.

FIG. 5 is a view showing an example of guide for securing processing accuracy of the machining apparatus 1.

A workpiece W to be machined is often set on a jig J as exemplified in FIG. 5. Thus, a guide 9 for performing copying processing along the shape of the jig J for setting the workpiece W to be machined by making the guide 9 contact with the jig J can be attached directly or indirectly to the arm 7 of the robot 4. For example, the guide 9 can be formed to the saw 2 or the attaching mechanism 3 which moves by a drive of the arm 7. In this case, the shape and structure of the jig J are also to be designed according to the shape and structure of the guide 9 so that copying processing of the workpiece W to be machined can be performed by making the guide 9 contact with the jig J.

In the example shown in FIG. 5, a honeycomb core W1 has been set, as the workpiece W to be machined, on the jig J for chamfer processing. On the other hand, a projection 9A is formed, as the guide 9, to a portion of the casing 5D of the band saw 5 which comes close to the jig J as the blade 5A of the band saw 5 has been inclined according to an angle of a chamfer. The jig J also has a bar shaped block J1, whose cross section is rectangular, as a guide for making the jig J contact with the projection 9A in the band saw 5 side. Therefore, when the arm 7 is moved with making the projection 9A in the band saw 5 side contact with the block J1 of the jig J, the blade 5A of the band saw 5 can be moved according to the shape of the chamfer with sufficient positioning accuracy.

That is, the jig J has the block J1 as a rail which guides the projection 9A in the band saw 5 side. Thereby, the band saw 5 can be moved along the block J1 which functions as a rail. Note that, similar copying processing is possible when a groove into which the projection 9A in the band saw 5 side fits is formed in the jig J.

An inclined angle of a chamfer of the honeycomb core W1 may not be constant. In such a case, changing also a direction of the band saw 5 according to the inclined angle of the chamfer of the honeycomb core W1 leads to efficient cutting processing. For that reason, when an inclined angle of a chamfer of the honeycomb core W1 is not constant, the shape of the block J1 can be determined so that a direction of the band saw 5 changes according to the inclined angle of the chamfer of the honeycomb core W1. That is, copying processing with changing the inclined angle of the band saw 5 can be performed by appropriately designing the shape of the projection 9A in the band saw 5 side and the shape of the block J1 of the jig J.

Figure 6:
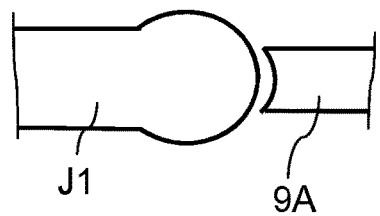
FIG. 6 is a bottom view showing the first modification of shapes of the block of the jig and the projection in the band saw side shown in FIG. 5.

FIG. 6 is a bottom view showing the first modification of shapes of the block J1 of the jig J and the projection 9A in the band saw 5 side shown in FIG. 5.

For example, the shape of the block J1 of the jig J can include a projection whose end part is circular as viewed from the lower surface side, as shown in FIG. 6. Meanwhile, according to the shape of the block J1, the projection 9A in the band saw 5 side can have a concave whose curvature is similar to that of the circular projection of the block J1. Then, it becomes possible to move the projection 9A in the band saw 5 side in a curved line by rotating the projection 9A along the circular projection of the block J1. Thereby, copying processing along the block J1 of the jig J can be performed with a change of an inclined angle of the band saw 5.

Figure 7:
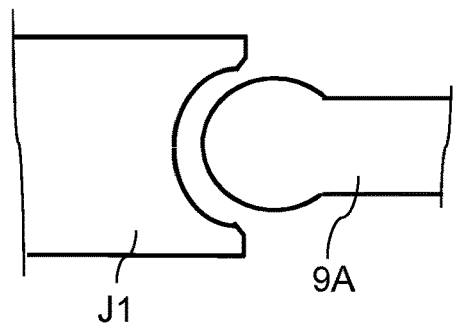
FIG. 7 is a bottom view showing the second modification of shapes of the block of the jig and the projection in the band saw side shown in FIG. 5.

FIG. 7 is a bottom view showing the second modification of shapes of the block J1 of the jig J and the projection 9A in the band saw 5 side shown in FIG. 5.

For example, the shape of the block J1 of the jig J can include a projection whose end part has a circular concave, as shown in FIG. 7. Meanwhile, according to the shape of the block J1, the projection 9A in the band saw 5 side can have a circular end part whose curvature is similar to that of the circular concave of the block J1. Then, it becomes possible to rotationally move the projection 9A in the band saw 5 side along the circular concave of the block J1. Thereby, copying processing along the block J1 of the jig J can be performed with a change of an inclined angle of the band saw 5.

As a matter of course, the shape of the block J1 of the jig J and the shape of the projection 9A in the band saw 5 side can be designed not only in the shapes exemplified in FIG. 6 and FIG. 7 but also in various shapes so as to maintain a relationship between a rail and a guide.

In addition, not only the processing example of the honeycomb core W1 shown in FIG. 5 but also in the case of outline processing of a panel or the like, copying processing of an outline can be performed by producing the jig J according to the outline of the panel. Furthermore, copying processing using the jig J and the guide 9 can be similarly performed also when a cutting tool, such as an end mill, other than the saw 2 has been attached to the arm 7 of the robot 4.

That is, a workpiece W to be machined made of a metal, a composite material, a honeycomb structure or the like can be processed along a shape of the jig J for setting the workpiece W, by a cutting tool attached to the arm 7 of the robot 4, with making the guide 9 directly or indirectly attached to the arm 7 contact with the jig J.

By such copying processing using the jig J and the guide 9, even a machined product whose tolerance is from ±0.1 mm to ±1.0 mm can be manufactured in accuracy satisfying the tolerance. Thereby, the machining apparatus 1 can automatically perform not only crude processing of a workpiece W to be machined but also finish processing of that.

In the case of performing copying processing using the jig J and the guide 9, it is effective to equip a pressure sensor 10 with the robot 4. The pressure sensor 10 measures force applied on the arm 7 of the robot 4. Therefore, the pressure sensor 10 can be attached with the arm 7. When the arm 7 has plural drive axes, it is practical to compose the pressure sensor 10 by combining plural sensors with each other so that respective pressures in plural directions can be measured individually.

When the pressure sensor 10 is equipped with the robot 4, force applied on the guide 9 from the jig J can be indirectly measured as force applied on the arm 7. Therefore, while force applied on the guide 9 from the jig J can be measured by the pressure sensor 10, feedback control of the robot 4 can be performed so that the force applied on the guide 9 from the jig J becomes constant.

That is, the control circuit 8 can have a function to perform feedback control of the robot 4 based on a measurement result by the pressure sensor 10 so that the force applied on the guide 9 from the jig J becomes constant. The control circuit 8 usually has a function to control the arm 7 by control program which instructs a moving amount from a certain position of the arm 7 to the next position of the arm 7, as an increment value relatively. Therefore, for example, the control circuit 8 can have a function to correct a control position of the arm 7, determined by the control program, based on a measured value of pressure by the pressure sensor 10 so that a load applied on the arm 7 becomes constant. In this case, an actual movement path of the electric power tool, such as the arm 7 and the saw 2, lies on positions derived by correcting control positions determined by the control program, by the feedback control.

As described above, copying processing, such as outline processing, can be performed with pressing the blade 5A of the band saw 5 or a tool, such as an end mill, against the jig J which has a shape according to a processing shape of a workpiece W to be machined, with constant force using the pressure sensor 10, instead of automatic control based on data representing a geometric shape of the workpiece W to be machined. Thereby, copying processing using the jig J and the guide 9 can be performed stably.

A commercially available multijoint robot often has a pressure sensor for recognizing whether an object has been gripped by a hand, as a standard specification, in the case of attaching a hand for gripping an object with the arm. A pressure sensor for sensing gripping force by a hand attached with an arm is usually disposed at the first joint of the arm, and is configured to be able to sense pressures in three axis directions. In such a case, force applied toward the guide 9 from the jig J can be measured as a vector using a pressure sensor in three axis directions, which is included in a multijoint robot as a standard specification.

A control value of force applied toward the guide 9 from the jig J can be determined as an appropriate value for every workpiece W to be machined, empirically or theoretically by processing tests or computer simulations. A pressure at the time of making the guide 9 contact with the jig J was actually measured by the pressure sensor 10, and copying processing of the jig J was performed with feedback control so that about 5 kg of load was applied in the arm 7 side. As a result, it has been confirmed that a workpiece W to be machined can be processed in sufficient accuracy.

When pressures in two axis directions or three axis directions can be sensed by the pressure sensor 10, not only the pressure applied on the guide 9 from the jig J but also cutting resistance can be measured as a pressure in a direction of a forward movement of a cutting tool, such as the saw 2. Cutting resistance tends to increase with wear of a cutting tool. Accordingly, a degree in wear and replacement time of a cutting tool can be perceived by measurement of cutting resistance.

In that case, the control circuit 8 can have a function to obtain and display an index expressing a degree of wear of a cutting tool or a function to notify a replacement time of the cutting tool, based on a measured value of a pressure in a traveling direction of the cutting tool, obtained from the pressure sensor 10. For example, a measured value itself of a pressure in a traveling direction of a cutting tool can be displayed on the display 8B as an index expressing a degree of wear of the cutting tool. Alternatively, a threshold may be set to a measured value of a pressure in a traveling direction of a cutting tool, and when a measured value of the pressure in the traveling direction of the cutting tool has become not less than the threshold or has exceeded the threshold, it can be determined that a replacement time of the cutting tool has come and coming of the replacement time can be output to the display 8B.

Some methods for improving positioning accuracy using the jig J, the guide 9, and the pressure sensor 10 have been described thus far. Alternatively, positioning accuracy may be improved by another method. As a specific example, there is a method of controlling a position of the arm 7 based on a reference position detected by at least one visible sensor 11 disposed on the machining apparatus 1.

The visible sensor 11 is an image sensor, such as an optical camera or an infrared camera. The visible sensor 11 can be disposed on a desired position. As a specific example, the first visible sensor 11A can be disposed on the arm 7 of the robot 4 while the second visible sensor 11B can be disposed on a position at which a relative positional relationship of a workpiece W to be machined, the saw 2, and the arm 7 can be sensed. Then, the first visible sensor 11A can sense the saw 2, which has been attached to the arm 7, and the workpiece W to be machined while the second visible sensor 11B can sense a relative positional relationship of the workpiece W to be machined, the saw 2, and the arm 7.

It is practical to control the arm 7 using the first visible sensor 11A attached to the arm 7, i.e., the first visible sensor 11A which moves with a tool, such as the saw 2, from a viewpoint of controlling a position of the arm 7 more accurately. For that reason, the arm 7 can be positioned using the first visible sensor 11A attached to the arm 7.

Figure 8:
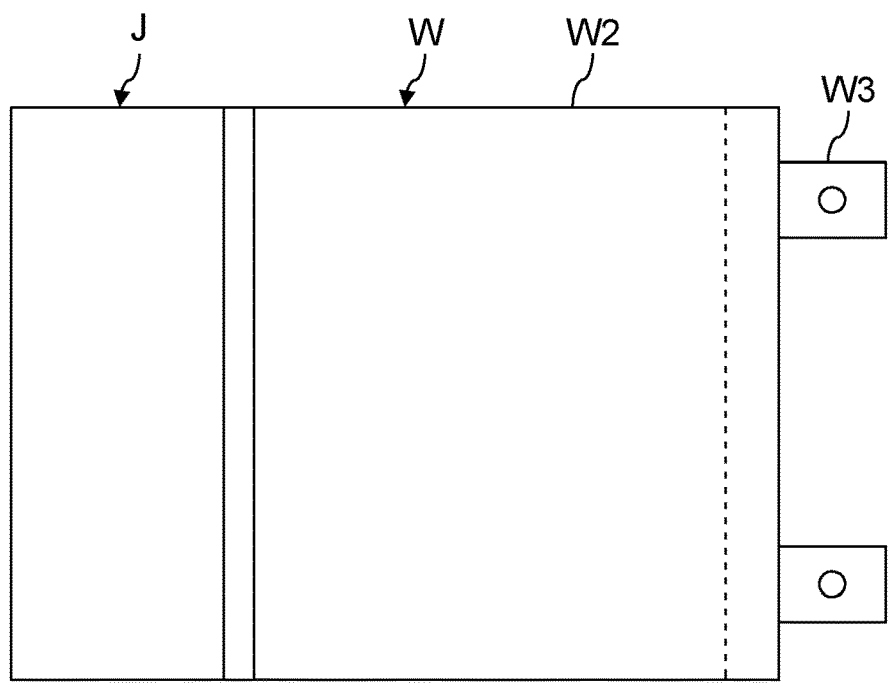
FIG. 8 is a top view showing an example of composite material panel to be machined by the machining apparatus shown in FIG. 1.
Figure 9:
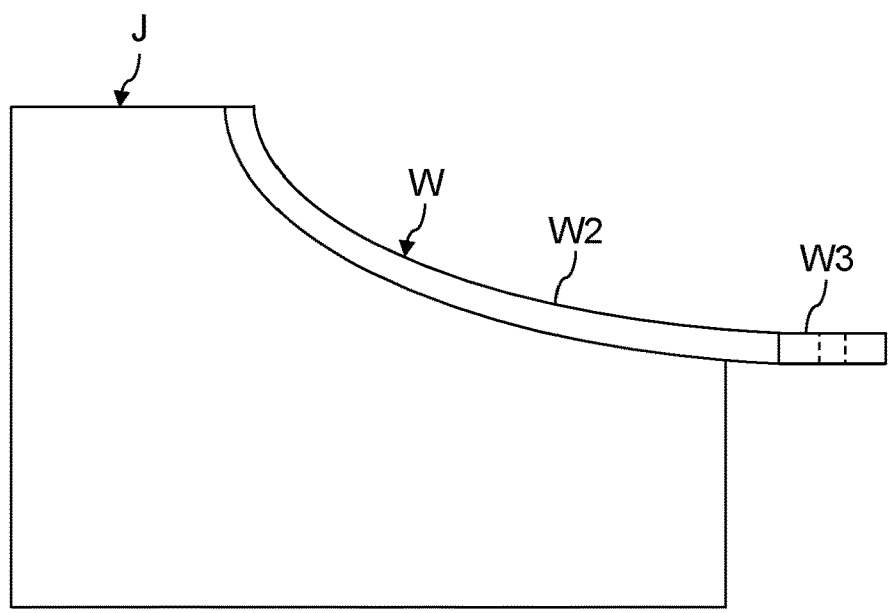
FIG. 9 is a side view of the composite material panel shown in FIG. 8.

FIG. 8 is a top view showing an example of composite material panel to be machined by the machining apparatus 1 shown in FIG. 1, and FIG. 9 is a side view of the composite material panel shown in FIG. 8.

As shown in FIG. 8 and FIG. 9, when a curved platy composite material panel W2 is a workpiece W to be machined, the composite material panel W2 can be fixed with the jig J with a clamp or a vacuum chuck. Furthermore, one hole or a plurality of holes can be formed as a reference position or reference positions in at least one of the jig J and an excess thickness of the composite material panel W2.

Then, each hole formed in at least one of the jig J and the excess thickness of the composite material panel W2 can be detected using the first visible sensor 11A attached to the arm 7. In addition, an outline of at least one of the jig J and the composite material panel W2 can also be detected using the first visible sensor 11A.

Thus, a position of the composite material panel W2 before processing can be specified on the basis of at least one of a position of each hole and the outline detected using the first visible sensor 11A. Thereby, a position of the arm 7 can be corrected based on the position of the composite material panel W2 before processing.

Note that, instead of a hole, a point or a mark which serves as a land mark may be engraved on at least one of the jig J and the excess thickness of the composite material panel W2, or a point or a mark which serves as a land mark may be displayed on at least one of the jig J and the excess thickness of the composite material panel W2.

In the example shown in the figures, the composite material panel W2 before processing has two tabs W3, and each of the two tabs W3 has a hole. Therefore, the holes of the tabs W3 and the outline of the composite material panel W2 before processing can be used as references. For example, the hole of one tab W3 can be detected by the first visible sensor 11A, and copying processing can be performed along the outline of the composite material panel W2 from a position where the arm 7 has been moved by a certain amount of offset from the hole of the tab W3. Alternatively, the positions of the two holes can be previously detected before processing by the first visible sensor 11A, and a moving path of the arm 7 can also be geometrically determined based on design information of the composite material panel W2 and the positions of the two holes.

When a land mark, such as a hole, cannot be formed in either a workpiece W to be machined or the jig J, a linear outline of the workpiece W to be machined or the jig J can be used as a reference for correcting a position of the arm 7.

For example, a linear outline of a workpiece W to be machined or the jig J can be detected using the first visible sensor 11A, and a position of a straight line having an offset from the detected linear outline can be a control position of the arm 7. In this case, an amount of offset can be geometrically determined based on design information of the workpiece W to be machined. As another method, a position of a workpiece W to be machined may be specified by detecting at least two linear outlines of the workpiece W to be machined or the jig J. In this case, a variety of processing, such as curve processing, can be performed based on design information of the workpiece W to be machined.

In the case of controlling the arm 7 using the first visible sensor 11A, the control circuit 8 has a function to determine a control position of the arm 7 based on image information acquired by the first visible sensor 11A. As a specific example, the control circuit 8 has a function to detect an outline and a position of a marker of a workpiece W to be machined or the jig J by image processing, such as outline extraction processing, threshold processing, and/or image recognition processing, of image data acquired by the first visible sensor 11A, and determine a moving path of the arm 7 based on previously given design information of the workpiece W to be machined. Furthermore, in the case of performing copying processing along an outline of a workpiece W to be machined or the jig J detected using the first visible sensor 11A, the control circuit 8 has a function to detect the outline of the workpiece W to be machined or the jig J by image processing of image data acquired by the first visible sensor 11A, and perform feedback control of a position of the arm 7 along the detected outline.

As described above, when the arm 7 is controlled based on image data acquired by the first visible sensor 11A, positioning accuracy of the arm 7 can be improved even when the jig J is not used or it is difficult to make the guide 9 contact with the jig J.

In particular, a commercially available multijoint robot occasionally has a visible sensor in an arm, as a standard specification, in addition to a pressure sensor. A visible sensor is included in a commercial multijoint robot for recognizing an object held by a hand when a hand has been attached with an arm. In such a case, the visible sensor included in the multijoint robot can be used for positioning in machining process.

At the time of cutting test before mass production processing of a workpiece W to be machined, it is desired to enable to check a situation where the workpiece W to be machined is being processed safely. For that reason, a workpiece W to be machined, a tool, such as the saw 2, and the arm 7 can be imaged by the second visible sensor 11B of which imaging field of view covers the arm 7, and can be displayed on the display 8B or another display. Thereby, it becomes possible to process the workpiece W to be machined with checking a relative positional relationship of the workpiece W to be machined, a tool, such as the saw 2, and the arm 7 through an image at the time of cutting test or the like (Operation and Action)

Next, a machining method for manufacturing a machined product using the machining apparatus 1 will be described.

Firstly, a desired cutting tool is attached to the arm 7 of the robot 4. An example of case where the electromotive saw 2, such as the band saw 5, a wire saw, or a chain saw, is attached to the arm 7 of the robot 4 with the attaching mechanism 3 will be described here. On the other hand, a workpiece W to be machined is set at a predetermined position. The workpiece W to be machined may be placed in a state where the workpiece W to be machined has been set on the jig J as necessary.

Furthermore, control program of the arm 7 according to a shape of the workpiece W to be machined is input into the control circuit 8. Thereby, machining process of the workpiece W to be machined can be started.

In the case of performing cutoff processing of the workpiece W to be machined with the saw 2, such as the band saw 5, it is a preferable processing condition to incline a blade, such as the blade 5A, with a predetermined angle toward a cutting direction in order to reduce cutting resistance. Nevertheless, when an inclined angle of the blade of the saw 2 is too large, the length of the blade which contacts the workpiece W to be machined becomes long. For example, when an inclined angle of the blade of the saw 2 is 45 degrees, the length of the blade which contacts the workpiece W to be machined increases to about 1.4 times as long as that in the case where the inclined angle of the blade of the saw 2 is zero degree. As a result, it is necessary to use a blade with high rigidity, of which upper limit of cutting length is longer.

Therefore, it is important to keep the length of an area of the blade, which touches a workpiece W to be machined, from becoming excessive, with suppressing cutting resistance. For that reason, it is desirable to incline the blade of the saw 2 with an appropriate angle determined in a range from 1 degree to 30 degrees according to a thickness and a material of a workpiece W to be machined, which is to be cut off.

A moving direction of a blade, such as the blade 5A, is desirable to be downward from a viewpoint of stably fixing a workpiece W to be machined. Specifically, when the blade of the saw 2 is moved downward, a workpiece W to be machined is pressed to the jig J or a floor with the blade of the saw 2. Thereby, the workpiece W to be machined can be stabilized.

In the case of inclining the blade of the saw 2, a control position of the arm 7 is programmed so that the blade of the saw 2 contacts with a workpiece W to be machined at a predetermined angle. Then, the control circuit 8 controls the arm 7 according to the control program of the arm 7. Thereby, the saw 2 moves with the arm 7. As a result, the blade of the saw 2 can cut off the workpiece W to be machined. Specifically, the workpiece W to be machined made of a metal, a composite material, or a honeycomb structure can be cut off with inclining the saw 2, such as the electromotive band saw 5, a wire saw, or a chain saw, by an angle from 1 degree to 30 degrees in the traveling direction.

Note that, sufficient positioning accuracy may not be acquired only by automatic control of the arm 7 by control program. Thus, the workpiece W to be machined made of a metal, a composite material, or a honeycomb structure can be processed along the shape of the jig J for setting the workpiece W, by the saw 2 attached to the arm 7 as a cutting tool, with making the guide 9 directly or indirectly attached to the arm 7 of the robot 4 contact with the jig J. In this case, force applied on the guide 9 from the jig J can be measured by the pressure sensor 10 disposed in the first joint or the like of the arm 7 of the robot 4. Then, feedback control of the arm 7 of the robot 4 can be performed by the control circuit 8 so that the force applied on the guide 9 from the jig J becomes constant.

Alternatively, control to correct a position of the arm 7 can also be performed based on a reference position detected based on an image acquired by the first visible sensor 11A attached to the arm 7 of the robot 4.

By such technique for improving positioning accuracy, even a machined product whose tolerance is from ±0.1 mm to ±1.0 mm can be manufactured. Thus, even an aircraft part to which design requirements are strict can be manufactured by machining process using the machining apparatus 1.

When cutoff processing of the workpiece W to be machined with the saw 2 is completed, machining process using another tool, such as an end mill, a chamfering tool, and/or a burring tool, may also be performed as necessary. As a matter of course, machining process using other tools may also be performed before cutoff processing of the workpiece W to be machined with the saw 2. Furthermore, cutoff processing of the workpiece W to be machined may also be performed with another saw 2 as another process.

When machining of the workpiece W to be machined is performed using plural tools including the saw 2, the workpiece W to be machined can be continuously processed by attaching the tools to the arms 7 of the plural robots 4 or the plural arms 7 of the single robot 4 respectively. Alternatively, the robot 4 may have an ATC (automatic tool changer) so that a tool attached to the arm 7 can be automatically exchanged. Furthermore, in the case that an exchange frequency of tool is low, attaching mechanisms for attaching the tools to the arm 7 respectively may be prepared so that a worker can manually exchange a tool attached to the arm 7 as described above.

Thus, machining including cutoff of a metal, a composite material, or a honeycomb structure can be performed using one tool or a plurality of tools including the saw 2, such as the band saw 5, a wire saw, or a chain saw. Thereby, a desired machined product can be manufactured.

Thus, the machining apparatus 1 as described above is configured by attaching the electromotive saw 2, such as the band saw 5, a wire saw, or a chain saw, to the arm 7 of the robot 4, such as a multijoint robot, with the attaching mechanism 3. Further, the machining method as described above is to manufacture a machined product by processing a metal, a composite material, or a honeycomb structure with a cutting tool attached to the arm 7 of the robot 4, such as a multijoint robot.

(Effect)

Accordingly, the machining apparatus 1 and the machining method allow machining of a workpiece W to be machined without using a large scale and expensive column type machine tool. In addition, outline trimming processing, chamfer processing, outline finish processing and the like of a workpiece W to be machined, which have been manually performed by a worker because of being unable to use an expensive machine tool, can be automated. That is, machining of a workpiece W to be machined can be automated without using a large scale and expensive column type machine tool. Thereby, manufacturing costs of a machined product can be dramatically reduced.

Furthermore, high precision machining process which has conventionally been considered to be difficult without a machine tool can be performed using the robot 4, such as a multijoint robot, by copying processing using the jig J or positional correction of the arm 7 using the visible sensor 11. Thereby, it becomes possible to process a large sized composite material panel or a honeycomb core, typical as an aircraft part for which it is desired to reduce manufacturing costs, at low cost with satisfying design specification. For example, a machined product having a tolerance from ±0.1 mm to ±1.0 mm can be manufactured by copying processing with feedback control using the guide 9 contacting with the jig J and the pressure sensor 10.

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A machining method,
    wherein a machined product is manufactured by processing a composite material or a honeycomb structure with a cutting tool attached to an arm of a multi-joint robot having a cantilever structure, the composite material or the honeycomb structure being processed with the cutting tool along a shape of a jig for setting the composite material or the honeycomb structure, the composite material or the honeycomb structure being processed by contacting a guide with the jig, the guide being attached to a casing of the cutting tool so as to extend from the casing into contact with the jig, and with the casing extending, in multi-joint robot support sequence, between the guide and a support location with the multi-joint robot, the cutting tool being a saw wherein a force applied on the guide from the jig is measured by a sensor, a feedback control of the robot is performed to make the force applied on the guide from the jig constant, wherein the machining method satisfies a tolerance accuracy in the cutting tool machined product of +1.0 mm, and
    wherein the feedback control of the robot comprises a control circuit that is configured to receive force values that are applied on the guide from the jig as measured by the sensor, and the feedback control of the robot is configured to achieve a constant force application by directing the force being applied on the guide from the jig to be constant, wherein the constant force application is utilized in providing tolerance accuracy in the cutting tool machined product.

2. The machining method according to claim 1, wherein the processing is a machining processing, including cutting of the composite material or the honeycomb structure with an electromotive band saw, wire saw, jigsaw or chain saw.

3. The machining method according to claim 2, wherein the composite material or the honeycomb structure is cut off at an incline by inclining the band saw, the wire saw, the jigsaw or the chain saw by 1 degree to 30 degrees in a direction of a forward movement.

4. The machining method according to claim 1, wherein a position of the arm is further controlled with a visible sensor.

5. The machining method according to claim 1, wherein the machining method includes controlled movement of an attachment end of the arm of the robot with a control circuit configured for three axes adjustment of the cutting tool while cutting.

6. The method of claim 1, further comprising an attachment mechanism joining the arm of the multi joint robot having the cantilever structure to the casing, and said attachment mechanism having first and second attachment implements attached to respective first and second ends of the casing.

7. The method of claim 1, wherein the arm has plural drive axes, and the sensor comprises a pressure sensor that includes plural sensor elements assigned, respectively, to the plural drive axes.

8. The method of claim 1, further comprising an attachment mechanism joining the arm of the multi-joint robot having the cantilever structure to the casing, and wherein, in multi joint robot support sequence, there is the attachment end of the cantilever arm attached directly to the attachment mechanism, the attachment mechanism attached directly to the casing at said support location, and the casing attached directly to the guide.

9. The method of claim 8, wherein the guide has a proximal end attached to the casing and a distal free end, and with the distal free end of the guide being in a male/female intermeshing engagement with the jig.

10. The method of claim 1, wherein the machining method satisfies a tolerance accuracy in the cutting tool machined product of ±0.1 mm.

11. The method of claim 1, wherein the guide has a notched recess and a flanged overhang, with the notched recess configured for jig reception, and the flanged overhang being configured for downward pressing on an upper surface of the jig and the notched recess being defined by a surface that assumes a lateral pressing on the jig during the cutting of the workpiece.

12. The method of claim 1, wherein the cutting tool includes a blade and the multiple-axes of movement freedom in the cantilever structure of the multi-joint arm provides for both a changing in the angle of the blade and a change in cutting direction of the blade during cutting.

13. A machining method, wherein a machined product is manufactured by processing a composite material or a honeycomb structure with a machine assembly comprising a multi-joint robot with a cantilever arm, the cantilever arm comprising an attachment end configured for attachment to a cutting tool, the composite material or the honeycomb structure being processed by contacting a guide with a jig for setting the composite material or the honeycomb structure, the guide being attached to a casing of the cutting tool as to extend from the casing into contact with the jig, and with the casing extending, in multi-joint robot support sequence, between the guide and the attachment end of the cantilever arm, the cutting tool being a saw, wherein the machining method includes controlled movement of the attachment end of the cantilever arm of the robot such that the attachment end, with attached cutting tool, is adjustable in three dimensional space while the cutting tool is cutting, and wherein a force applied on the guide from the jig is measured by a sensor, and a feedback control of the robot is performed to make the force applied on the guide from the jig constant, and wherein the machining method satisfies a tolerance accuracy in the cutting tool machined product of +1.0 mm, and wherein the feedback control of the robot comprises a control circuit that is configured to receive force values that are applied on the guide from the jig as measured by the sensor, and the feedback control of the robot is configured to achieve a constant force application by directing the force being applied on the guide from the jig to be constant, wherein the constant force application is utilized in providing tolerance accuracy in the cutting tool machined product.

14. The machining method according to claim 13, wherein the processing is machining processing, including cutting of the composite material or the honeycomb structure with an electromotive band saw, wire saw, jigsaw or chain saw.

15. The machining method according to claim 14, wherein the composite material or the honeycomb structure is cut off at an incline by inclining the band saw, the wire saw, the jigsaw or the chain saw by 1 degree to 30 degrees in a direction of a forward movement.

16. The machining method according to claim 13, wherein a position of the arm is further controlled with a visible sensor.

17. The method of claim 13, further comprising an attachment mechanism joining the arm of the multi joint robot having the cantilever structure to the casing, and said attachment mechanism having first and second attachment implements attached to respective first and second ends of the casing.

18. The method of claim 13, wherein the arm has plural drive axes, and the sensor comprises a pressure sensor that includes plural sensor elements assigned, respectively, to the plural drive axes.

19. The method of claim 13, further comprising an attachment mechanism joining the arm of the multi joint robot having the cantilever structure to the casing, and wherein, in multi joint robot support sequence, there is the attachment end of the cantilever arm attached directly to the attachment mechanism, the attachment mechanism attached directly to the casing, and the casing attached directly to the guide.

20. The method of claim 19, wherein the guide has a proximal end attached to the casing and a distal free end, and with the distal free end of the guide being in a male/female intermeshing engagement with the jig, which male/female intermeshing arrangement includes a concave/convex intermeshing arrangement that provides a pivot point location between the guide and jig.

21. The method of claim 13, wherein the machining method satisfies a tolerance accuracy in the cutting tool machined product of ±0.1 mm.

* * * * *